(12) United States Patent
Mathew et al.

(10) Patent No.: US 11,216,463 B2
(45) Date of Patent: Jan. 4, 2022

(54) RELATIONAL DATABASE SYSTEM JOIN QUERY TABLE SCAN BYPASS

(71) Applicant: Hewlett Packard Enterprise Development LP, Houston, TX (US)

(72) Inventors: Shine Mathew, Bangalore (IN); Ashish Dange, Bangalore (IN); Arvind Kumar, Chhillar Dadhi (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 133 days.

(21) Appl. No.: 16/262,757

(22) Filed: Jan. 30, 2019

(65) Prior Publication Data
US 2020/0242119 A1    Jul. 30, 2020

(51) Int. Cl.
*G06F 17/30* (2006.01)
*G06F 16/2453* (2019.01)
*G06F 16/28* (2019.01)

(52) U.S. Cl.
CPC ...... *G06F 16/24544* (2019.01); *G06F 16/288* (2019.01)

(58) Field of Classification Search
CPC ........ G06F 16/13; G06F 16/24; G06F 16/156; G06F 16/2453; G06N 3/00; G06N 5/00; G05B 13/00
See application file for complete search history.

(56) References Cited

U.S. PATENT DOCUMENTS

| | | | |
|---|---|---|---|
| 5,758,335 A * | 5/1998 | Gray | G06F 16/24544 |
| 5,873,074 A * | 2/1999 | Kashyap | G06F 16/2456 |
| 7,868,789 B1 | 1/2011 | Binnig | |
| 9,715,414 B2 | 7/2017 | Muthulingam | |
| 10,649,991 B2 * | 5/2020 | Finlay | G06F 16/2453 |
| 10,725,995 B2 * | 7/2020 | Finlay | G06F 16/24539 |
| 2005/0114316 A1 * | 5/2005 | Fontoura | G06F 16/81 |
| 2006/0085464 A1 | 4/2006 | Beuch | |
| 2008/0071785 A1 | 3/2008 | Kabra | |
| 2008/0154893 A1 * | 6/2008 | Ting | G06F 16/8373 |
| 2008/0215544 A1 * | 9/2008 | Galindo-Legaria | G06F 16/2452 |
| 2009/0083238 A1 * | 3/2009 | Chaudhuri | G06F 16/24561 |
| 2011/0055199 A1 * | 3/2011 | Siddiqui | G06F 16/2456 707/714 |
| 2011/0082854 A1 | 4/2011 | Eidson | |
| 2011/0137890 A1 * | 6/2011 | Bestgen | G06F 16/24544 707/719 |

(Continued)

OTHER PUBLICATIONS

"Techniques for Improving the Performance of SQL Queries under Workspaces in the Data Service Layer," IBM, Retrieved from Internet Aug. 9, 2018, 13 pages, https://www.ibm.com/support/knowledgecenter/en/SSZLC2_9.0.0/com.ibm.commerce.developer.doc/refs/rsdperformanceworkspaces.htm >.

*Primary Examiner* — Hung D Le
(74) *Attorney, Agent, or Firm* — Rathe Linderbaum LLP (57) ABSTRACT

A relational database system for performing a join operation between a first table and a second table may include a query analyzer and an optimization engine. The query analyzer may compare predicates of a join operation query for an American National Standards Institute (ANSI) compliant database. The optimization engine, based upon comparison of the predicates, is to bypass a scan of the second table as part of outputting semantically correct results for the join operation.

20 Claims, 6 Drawing Sheets

(56) References Cited

U.S. PATENT DOCUMENTS

| | | | |
|---|---|---|---|
| 2014/0095471 A1* | 4/2014 | Deshmukh | G06F 16/24542 707/714 |
| 2015/0227585 A1 | 8/2015 | Braham | |
| 2016/0179890 A1* | 6/2016 | Chiang | G06F 16/24544 707/714 |
| 2016/0350347 A1 | 12/2016 | Das | |
| 2017/0046367 A1* | 2/2017 | Chang | G06F 16/24554 |

\* cited by examiner

FIG. 8 ns of an example relational database system.
FIG. 2 is a block diagram schematically illustrating portions of an example scan redundancy eliminator.
FIG. 3 is a flow diagram of an example join operation query handling method.
FIG. 4 is a block diagram schematically illustrating portions of an example relational database system.
FIG. 5 is a flow diagram of an example join operation query handling method.
FIG. 6 is a block diagram schematically illustrating portions of an example relational database system.
FIG. 7 is a flow diagram of an example join operation query handling method.
FIG. 8 is a flow diagram of an example join operation query handling method.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed herein are example relational database systems, query handling methods and computer-readable mediums that facilitate more efficient and timely database query performance. In the database world, reading data (a file scan) from a table/file is considered as one of the most expensive operations during query operation. Costs associated with a file scan increase with the number records present in the table. In many real-world applications, tables may have multimillion records. For example, employee record databases, financial record databases, healthcare databases and the like may contain multiple tables with millions of records. Reading and processing such records may consume a considerable amount of input/output time, memory and CPU cycles.

Although machine generated queries facilitate high-frequency rapid searching of relational database tables, machine generated queries are sometimes poorly framed, specifying redundant tables, mutually exclusive predicates or predicates that always evaluate to be true. Execution of such poorly framed queries results in a waste of resources and output delays.

The disclosed relational database systems, query handling methods and computer-readable mediums preemptively identify such poorly framed queries and alter handling of the query so as to bypass a scan or read operation of the join operation when outputting semantically correct results for the join operation. By bypassing an otherwise unnecessary or redundant scan or read operation, the disclosed relational database systems, query handling methods and computer-readable mediums reduce CPU usage, reduce memory usage, reduce input/output operations, reduce inter process communications, improve concurrency in response time while reducing the amount of data being routed.

Disclosed herein is an example relational database system for performing a join operation between a first table and a second table. The system may include a query analyzer and an optimization engine. In one implementation, the query analyzer may be a module separate from optimization engine or may be part of an overall larger query optimizer that includes both the query analyzer and the optimization engine. The query analyzer may compare predicates of a join operation query for an American National Standards Institute (ANSI) compliant database. The optimization engine, based upon the comparison of the predicates, bypasses a scan of the second table while outputting semantically correct results for the join operation. In some implementations, the optimization engine, based upon comparison of the predicates, may bypass a scan of both the first table and the second table.

In some implementations, the optimization engine may carry out the join operation by using a dummy node or dummy input in place of the table or tables for which the scan was bypassed. In some implementations, the optimization engine not only skips the scan of at least one table based upon the predicate comparison, but also skips the join operation altogether. In particular, in some implementations, the optimization engine includes a dummy node module that, based upon the predicate comparison, automatically and directly outputs required values, such as a "null" value, that are semantically correct results for the join operation. In some implementations, the dummy node module is part of the join module itself that carries out the join operation. In other implementations, the dummy node module is part of another existing module of the optimization engine.

Disclosed herein is an example method for responding to a machine generated relational database query. The method may include analyzing an American National Standards Institute (ANSI) join operation query for two tables to compare predicates of the join operation query. Based upon the comparison of the predicates, a scan of at least one of the two tables is bypassed while outputting semantically correct ANSI compliant results for the join operation query. As should be appreciated, the same scan bypass operations described herein may be applied to the scanning of greater than two tables.

Disclosed herein is an example of scan redundancy eliminator for use with an American National Standards Institute (ANSI) relational database system. The scan redundancy eliminator may be in the form of a non-transitory computer-readable medium containing instructions to direct a processor to analyze a join operation query for two tables to compare predicates of the join operation query; and output a scan bypass command to bypass a scan of at least one of the two tables based upon a comparison of the predicates of the join operation query while returning semantically correct results for the join operation query.

Figure 1:
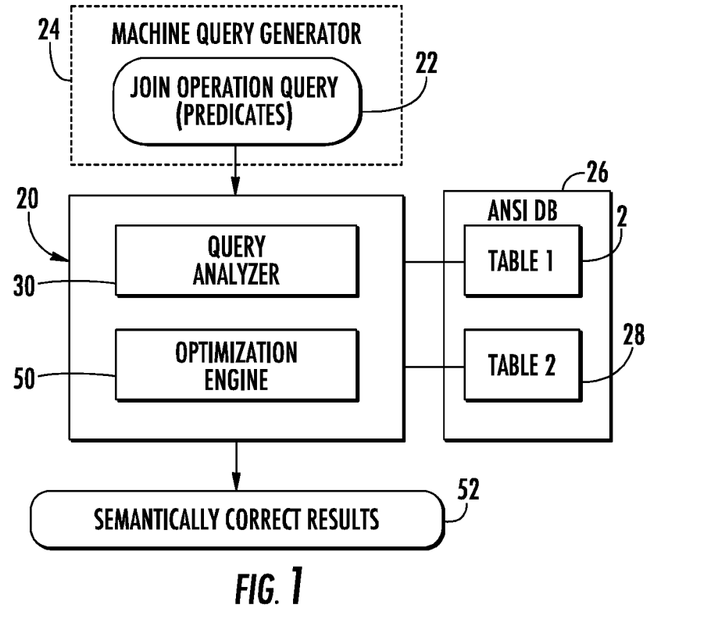

FIG. 1 is a block diagram schematically illustrating portions of an example relational database system 20 for handling join operation queries of an American National Standards Institute (ANSI) compliant database. System 20 preemptively identifies improperly framed queries and alters the handling of such queries so as to bypass a scan (or read operation) of one or more tables while performing the join operation at the same time outputting semantically correct results for that join operation. System 20 compares the predicates of join operation queries to determine whether the predicates are mutually exclusive (always false) or predicates or conditions that are always true. In response to the predicates of the join operation query being always true or always false, system 20 bypasses the scan or read operation of at least one of the tables. By bypassing an otherwise unnecessary or redundant scan or read operation, system 20 may reduce CPU usage, may reduce memory usage, may reduce input/output operations, may reduce inter process communications and, may improve concurrency in response time while reducing the amount of data being routed. System 20 comprises query analyzer 30 and optimization engine 50. In one implementation, query analyzer 30 may be a module separate from optimization engine 50 or may be part of an overall larger query optimizer that includes both the query analyzer 30 and the optimization engine 50.

Query analyzer 30 receives a join operation query 22 with respect to an ANSI compliant database 26 comprising tables 28-1 and 28-2. The join operation query 22 may include WHERE and ON predicates. In one implementation, the join operation query received by query analyzer 30 is generated by a machine query generator 24 (shown in broken lines). Use of the machine query generator 24 facilitates high-frequency, rapid database searches and queries. Although facilitating such high-frequency, rapid database searches, machine query generator 24 may sometimes produce poorly framed queries, queries that have mutually exclusive (always false) predicates or predicates that always evaluate to be true. Execution of such poorly framed queries may result in redundant or unnecessary files scans or reads.

The table below illustrates those conditions under which table scans may become redundant.

| Join Type | WHERE Clause | ON Clause | Left Table | Right Table |
|---|---|---|---|---|
| Inner Join | NA | Always evaluates to be FALSE | Redundant | Redundant |
| Inner Join | Always evaluates to be FALSE | NA | Redundant | Redundant |
| Left Outer Join | NA | Always evaluates to be FALSE | Required | Redundant |
| Left Outer Join | Always evaluates to be FALSE | NA | Redundant | Redundant |
| Right Outer Join | NA | Always evaluates to be FALSE | Redundant | Required |
| Right Outer Join | Always evaluates to be FALSE | NA | Redundant | Redundant |
| Full Outer Join | NA | Always evaluates to be FALSE | Required | Required |
| Full Outer Join | Always evaluates to be FALSE | NA | Redundant | Redundant |
| Semi Join | **Always evaluates to be FALSE | NA | Redundant | Redundant |
| Anti-Semi Join | **Always | NA | Required | Redundant |
| Join | | evaluates to be FALSE | | |

**WHERE clause of the subquery

One example of a join operation query, generated by a machine query generator and including mutually exclusive predicates, the join condition always evaluates to be FALSE, is as follows:
SELECT * FROM T1 LEFT JOIN T2 ON T1.COL1=T2.COL1 AND T1.COL1=10 AND T2.COL1=20 WHERE T1.COL1 IS NOT NULL One example of a join operation query, generated by a machine query generator and including where the join condition always evaluates to be TRUE, is as follows:
SELECT * FROM T1 WHERE T1.COL1 NOT IN (SELECT TT1.COL1 FROM T1 AS TT1 WHERE T1.COL1=TT1.COL1)

Query analyzer 30 comprise a module, a set of programming or code, to direct a processor to compare the predicates of the join operation query to determine whether the query contains mutually exclusive or always true predicates. In one implementation, query analyzer 30 may be a module separate from optimization engine 50 or may be part of an overall larger query optimizer that includes both the query analyzer 30 and the optimization engine 50.

Optimization engine 50 comprise a module, a set of program or code, that, based upon the comparison of the predicates carried out by query analyzer 30, directs a processor to bypass a scan of table 28-2, as part of outputting the semantically correct results 52 for the join query. In some implementations, optimization engine, depending upon the predicate comparison, optimization engine 50 may direct the processor to bypass a scan of both of table 28-1 and 28-2 when outputting the semantically correct results 52 for the joint query. In some implementations, the optimization engine 50 carries out the join operation using a dummy node or dummy input in place of the table or tables for which the scan was bypassed. In some implementations, the optimization engine 50 not only skips the scan of at least one table based upon the predicate comparison, but also skips the join operation. In particular, in some implementations, the optimization engine includes a dummy node module that, based upon the predicate comparison, automatically and directly outputs a dummy value, such as a "null" value, as part of the semantically correct results for the join operation. In some implementations, the dummy node module is part of the join module that carries out the join operation. In other implementations, the dummy node module is part of another existing module of the optimization engine 50.

Figure 2:
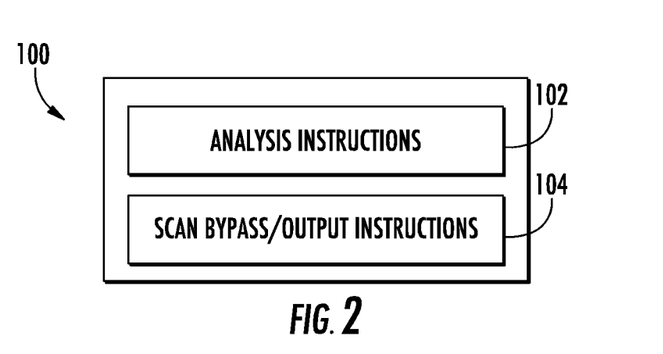

FIG. 2 is a block diagram illustrating portions of an example scan redundancy eliminator 100 for use with an American National Standards Institute (ANSI) relational database system. Scan redundancy eliminator 100 comprises a non-transitory computer-readable medium that contains instructions for a processor. Scan redundancy eliminator 100 preemptively identifies improperly framed queries and alters the handling such queries so as to bypass a scan or read operation of the join operation when outputting semantically correct results for the join operation. Scan redundancy eliminator 100 compares the predicates of join operation queries to determine whether the predicates are mutually exclusive (always false) or always true predicates. In response to the predicates of the join operation query being always true or always false, scan redundancy eliminator 100 bypasses the scan or read operation of at least one of the tables. By bypassing an otherwise unnecessary or redundant scan or read operation, scan redundancy eliminator 100 may reduce CPU usage, may reduce memory usage, may reduce input/output operations, may reduce inter process communications and, may improve concurrency in response time while reducing the amount of data being routed. Scan redundancy eliminator 100 comprises analysis instructions 102 and scan bypass/output instructions 104.

Analysis instructions 102 comprises instructions to direct a processor to analyze a join operation query for two tables to compare predicates of the join operation query. Analysis instructions 102 may direct the processor to determine whether a join operation query, such as a join operation query generated by a machine query generator, is formed from mutually exclusive (always false) predicates or always true predicates.

Bypass/output instructions 104 comprise instructions to direct a processor to output a scan bypass command to bypass a scan of at least one of the two tables based upon the comparison of the predicates of the join operation query while returning semantically correct results for the join operation query.

In some implementations, the scan bypass operation results in the join operation being carried out using a dummy node or dummy input in place of the actual table or tables for which the scan was bypassed. In some implementations, the scan bypass command results in not only bypassing of the scan of at least one table based upon the predicate comparison, but also skipping of the join operation. In this case, the scan bypass command may result in a dummy node, to output required values such as a "null" value, being directly outputted to return semantically correct results for the join operation.

Figure 3:
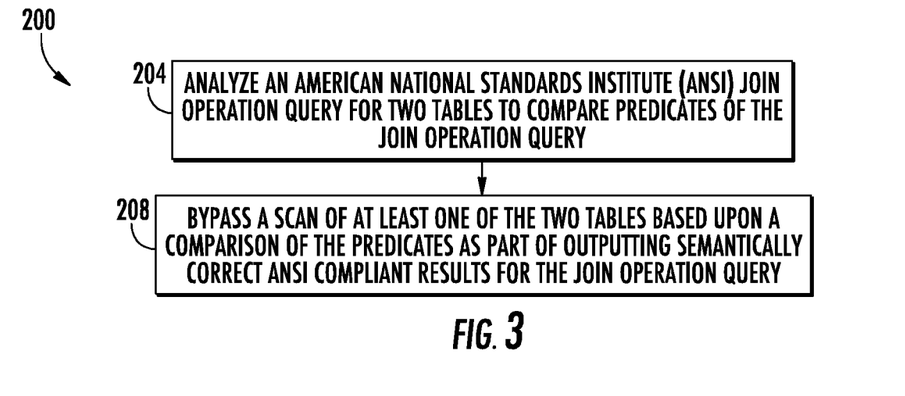

FIG. 3 is a flow diagram of portions of an example join operation query handling method 200 for outputting ANSI compliant results in response to a join operation query to an ANSI compliant database where the query contains mutually exclusive or always true predicates. As with system 20 and scan redundancy eliminator 100 described above, method 200 preemptively identifies improperly framed queries and alters the handling of such queries so as to bypass a scan or read operation of the join operation when outputting semantically correct results for the join operation. Although method 200 is described as being carried out by system 20 described above, it should be appreciated that method 200 may likewise be carried out with any of the relational database systems described in this disclosure or with other similar relational database systems.

As indicated by block 204, an ANSI join operation query for two tables is analyzed to compare predicates of the query. The evaluation of the predicates is carried out to determine whether a join operation query, such as a join operation query generated by a machine query generator, has mutually exclusive (always false) predicates or always true predicates. The evaluation may be made with respect to WHERE and/or ON clause predicates of the query.

As indicated by block 208, based upon the comparison of the predicates, a scan of at least one of the two tables is bypassed while outputting semantically correct ANSI compliant results for the join operation query. In some implementations, the join operation is carried out using a dummy node or dummy input in place of the actual table or tables for which the scan was bypassed. In some implementations, not only is the scan of at least one table based upon the predicate comparison skipped or bypassed, but the join operation is also bypassed. In particular, a dummy node to generate desired values, such as a "null" value, is directly outputted to return semantically correct results for the join operation, without the join operation actually being carried out.

Figure 4:
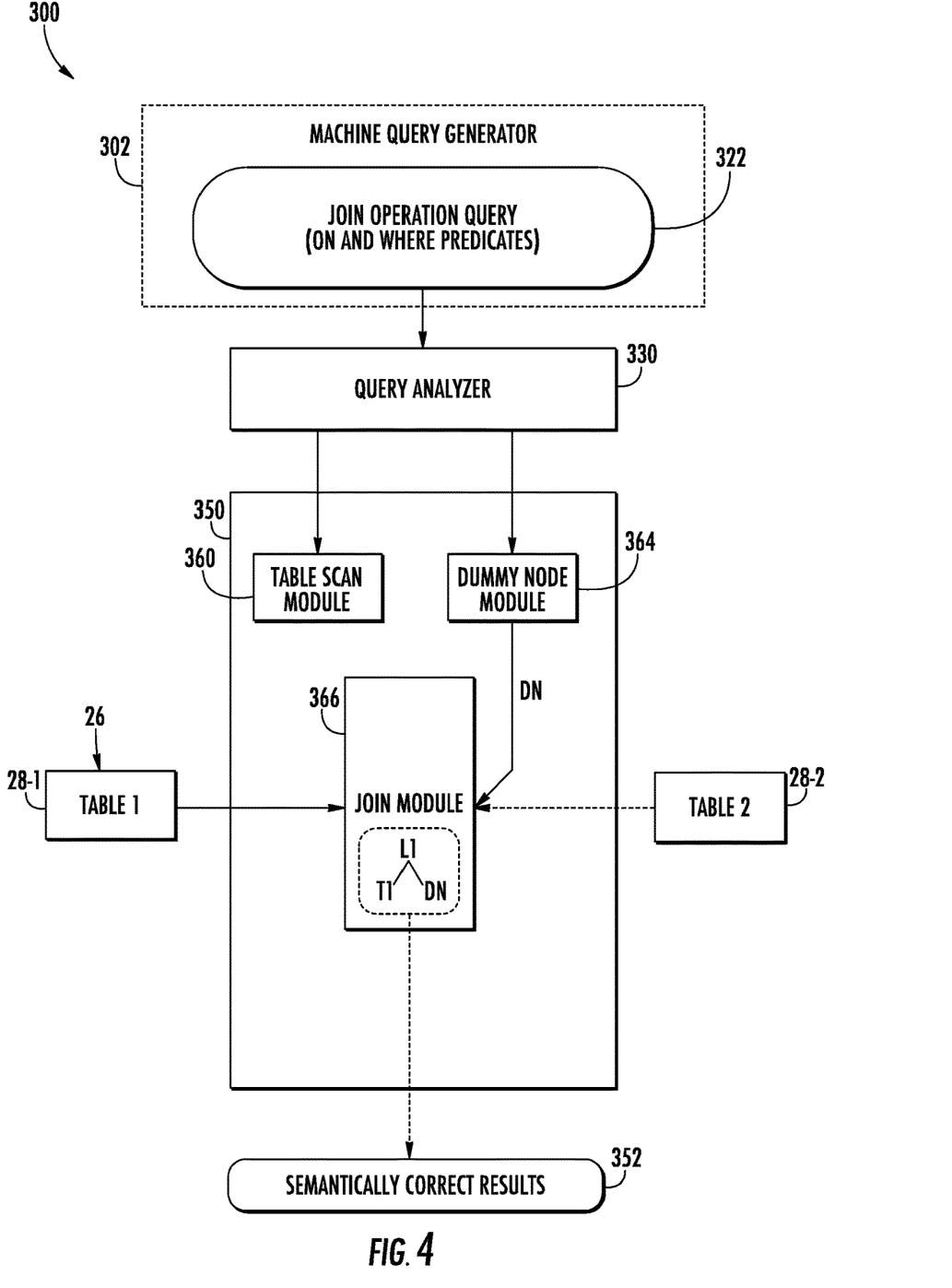

FIG. 4 is a block diagram schematically illustrating portions of an example relational database system 300. Database system 300 is similar to database system 20 in that database system 300, in response to the predicates of the join operation query being always true or always false, bypasses the scan or read operation of at least one of the tables. By bypassing an otherwise unnecessary or redundant scan or read operation, system 300 may reduce CPU usage, may reduce memory usage, may reduce input/output operations, may reduce inter process communications and, may improve concurrency in response time while reducing the amount of data being routed. Relational database system 300 carries out the join operation of the query using a dummy node or dummy input in place of the table or tables for which the scan was bypassed. Database system 300 comprises ANSI compliant database 26 comprising tables 28-1 and 28-2 (collectively referred to as tables 28) (described above), machine query generator 302, machine query analyzer 330 and optimization engine 350. In one implementation, query analyzer 330 may be a module separate from optimization engine 350 or may be part of an overall larger query optimizer that includes both the query analyzer 330 and the optimization engine 350.

Machine query generator 302 comprises a processor that automatically generates join operation queries 322 for database 26. A join operation query may be in the form of outer joins, inner joins, semi joins and anti-semi joins. Outer Joins may be full outer joins, left outer joins or right outer joins. Such join operation queries are composed of WHERE clause and ON clause PREDICATES. The automatic generation of join operation queries refers to the output of a join operation query without human intervention or review based upon received inputs. Machine query generator 302 facilitates data extraction from database 26 which may contain millions of data entries or table entries in a dynamic, and efficient fashion.

Query analyzer 330 is similar to query analyzer 30 described above. Query analyzer 330 comprise a module, a set of programming or code, to direct a processor to evaluate the predicates of the join operation query 322 to determine whether the query 322 contains mutually exclusive or always true predicates. Query analyzer 330 may evaluate both the WHERE and the ON predicates of query 322. The table above provides circumstances where a particular query 322 may contain mutually exclusive or predicates or conditions that are always true which would otherwise result in a redundant file scan.

Optimization engine 350 is similar to optimization engine 50 described above in that optimization engine 350 receives the join operation query 322 and outputs ANSI compliant semantically correct results 352 for the query 322. Optimization engine 350 bypasses a scan of at least one of tables of 28 based upon the evaluation and analysis of the predicates of query 322 by query analyzer 330. Optimization engine 350 comprises table scan module 360, dummy node module 364 and join module 366. The join module and the table scan module may, in some implementations, be part of a larger execution module.

Table scan module 360 comprises code, programming or other instructions contained in a non-transitory computer-readable medium that directs a processor to scan tables 28 based upon the predicate evaluation by query analyzer 330.

Dummy node module 364 comprises code, programming or other instructions contained in a non-transitory computer-readable medium that directs the processor to generate a dummy value or dummy node DN (that generates the dummy values) for either of the two tables for which a scan was bypassed or not performed by table scan module 360. The dummy node DN serves as an input to join module 366 and is associated with one of tables 28 in place of the values that would otherwise be provided from a scan of the associated table.

Join module 366 comprises code, programming or instructions contained in a non-transitory computer-readable medium for directing a processor to utilize the inputs provided by table scan module 360 and dummy node module 364 and to carry out the join operation as requested by query 322 and set us to output the semantically correct results 352. In the example illustrated, the query 322 is illustrated as comprising a left join (LJ) join operation query, wherein the predicates have been determined to query analyzer 33026 mutually exclusive, always false. As a result, table scan module 360 carries out a scan of table 28-1 (the left table) and provides the scanned data T1 as input to join module 366, but bypasses the scan of table 28-2 (the right table). Instead, dummy node module 364 outputs the dummy values (in this left join case, these dummy values are NULLs for required columns of table 28-2) DN for table 28-2 which serves as input for table 28-2 in place of the data that would otherwise be provided by the scan of table 28-2.

Figure 5:
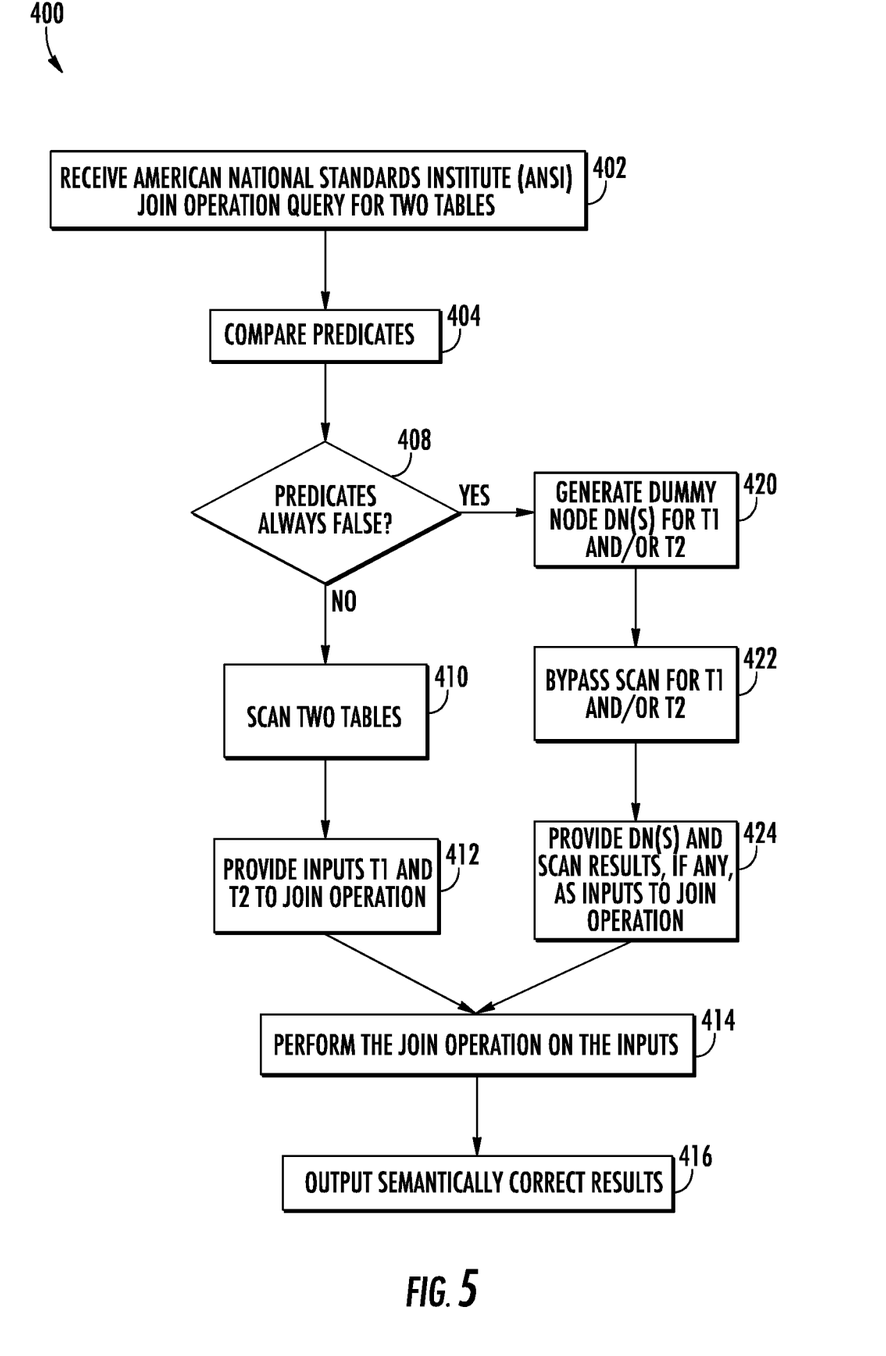

FIG. 5 is a flow diagram of an example ANSI join operation query response method 400 being carried out by system 300. As indicated by block 402, query analyzer 330 receives the ANSI join operation query for the two tables 28. As described above, the join operation query may be one that is automatically generated or output by machine query generator 302. This automated process for the generation of queries is largely without human intervention and is carried out at relatively high frequencies.

As indicated by block 404, query analyzer 330 evaluates the predicates of the query to determine whether the predicates are mutually exclusive (always false). As indicated by decision block 408 and block 410, if the predicates are not always false, are not mutually exclusive, table scan module 360 proceed with scanning of both tables 28-1 and 28-2. As indicated by block 412, the results of such table scans are provided inputs T1 and T2 to join module 366. Thereafter, as indicated by blocks 414 and 416, join module 366 performs a join operation on the inputs and outputs the semantically correct results for the join operation.

As indicated by decision block 408 and block 420, in response to the query analyzer determining that the predicates are mutually exclusive, are always false, query analyzer 330 outputs signals triggering the generation of a dummy node for at least one of tables 28. As indicated by block 422, those tables for which a dummy node is generated, are bypassed, are not scanned by table scan module 360. As indicated by block 424, the dummy nodes in the scan results for either of the two tables 28, if any, are provided inputs to the join operation carried out by join module 366. Thereafter, as indicated by blocks 414 and 416, join module 366 performs a join operation on the inputs and outputs the semantically correct results for the join operation.

The particular table 28 for which a dummy node is generated is dependent upon the particular table for which a scan is being bypassed which is dependent upon the nature of the join operation query. The table below identifies those tables for which a scan is bypassed and for which a dummy node is alternatively generated in its place for each of the various types of joint operations.

IJ—Inner Join, LJ—Left Outer Join, RJ—Right Outer Join, FJ—Full Outer Join, SJ—Semi Join, AJ—Anti Semi Join

| Join Type | Condition | Original Relational Expression | Bypass Dummy Node(s) |
|---|---|---|---|
| Inner Join | ON Clause always evaluates to FALSE | IJ / \ T1  T2 | IJ / \ DN  DN |
| Inner Join | WHERE Clause always evaluates to FALSE | IJ / \ T1  T2 | IJ / \ DN  DN |
| Left Outer Join | ON Clause always evaluates to FALSE | LJ / \ T1  T2 | LJ / \ T1  DN |
| Left Outer Join | WHERE Clause always evaluates to FALSE | LJ / \ T1  T2 | LJ / \ DN  DN |
| Right Outer Join | ON Clause always evaluates to FALSE | RJ / \ T1  T2 | RJ / \ DN  T2 |
| Right Outer Join | WHERE Clause always evaluates to FALSE | RJ / \ T1  T2 | RJ / \ DN  DN |
| Full Outer Join | WHERE Clause always evaluates to FALSE | FJ / \ T1  T2 | FJ / \ DN  DN |
| Semi Join | **WHERE Clause always evaluates to FALSE | SJ / \ T1  T2 | SJ / \ DN  DN |
| Anti-Semi Join | **WHERE Clause always evaluates to FALSE | AJ / \ T1  T2 | AJ / \ T1  DN |

**WHERE clause of the subquery

As shown by the above table, the dummy module or dummy node module 364 outputs a dummy node/input and a second dummy node/input in response to the join operation query being one of a full outer join and a semi join and the join operation query being identified as having mutually exclusive "where" clause predicates. In such circumstances, join module outputs the semantically correct results for the join operation query using the dummy node and the second dummy node in place of the first and second inputs that would otherwise be provided by scans of the first and second tables, respectively.

The dummy module or dummy node module 364 outputs a first dummy input/node and a second dummy/input node in response to the join operation query being an outer join and the join operation query being identified as having mutually exclusive "where" clause predicates. In such circumstances, the join module outputs the semantically correct results for the join operation query using the first dummy input/node and the second dummy input/node in place of the first input and the second input, respectively, that would otherwise be provided by scans of the first and second tables, respectively.

The dummy module or dummy node module 364 outputs a first dummy input/node and a second dummy input/node in response to the join operation query being an inner join and the join operation query being identified as having mutually exclusive "on" clause predicates. In such circumstances, the join module outputs the semantically correct results for the join operation query using the first dummy input/node and the second dummy input/node in place of the first input in the second input that would otherwise be provided by scans of the first and second tables, respectively.

The dummy module or dummy node module 364 outputs a second dummy input/dummy node in response to the join operation query being an anti-semi join and the join operation query being identified as having mutually exclusive (always evaluates to be false) "where" clause predicates. In such circumstances, join module outputs the semantically correct results for the join operation query using the second dummy input/node in place of the second input, that would otherwise be provided by scans of the second table.

Figure 6:
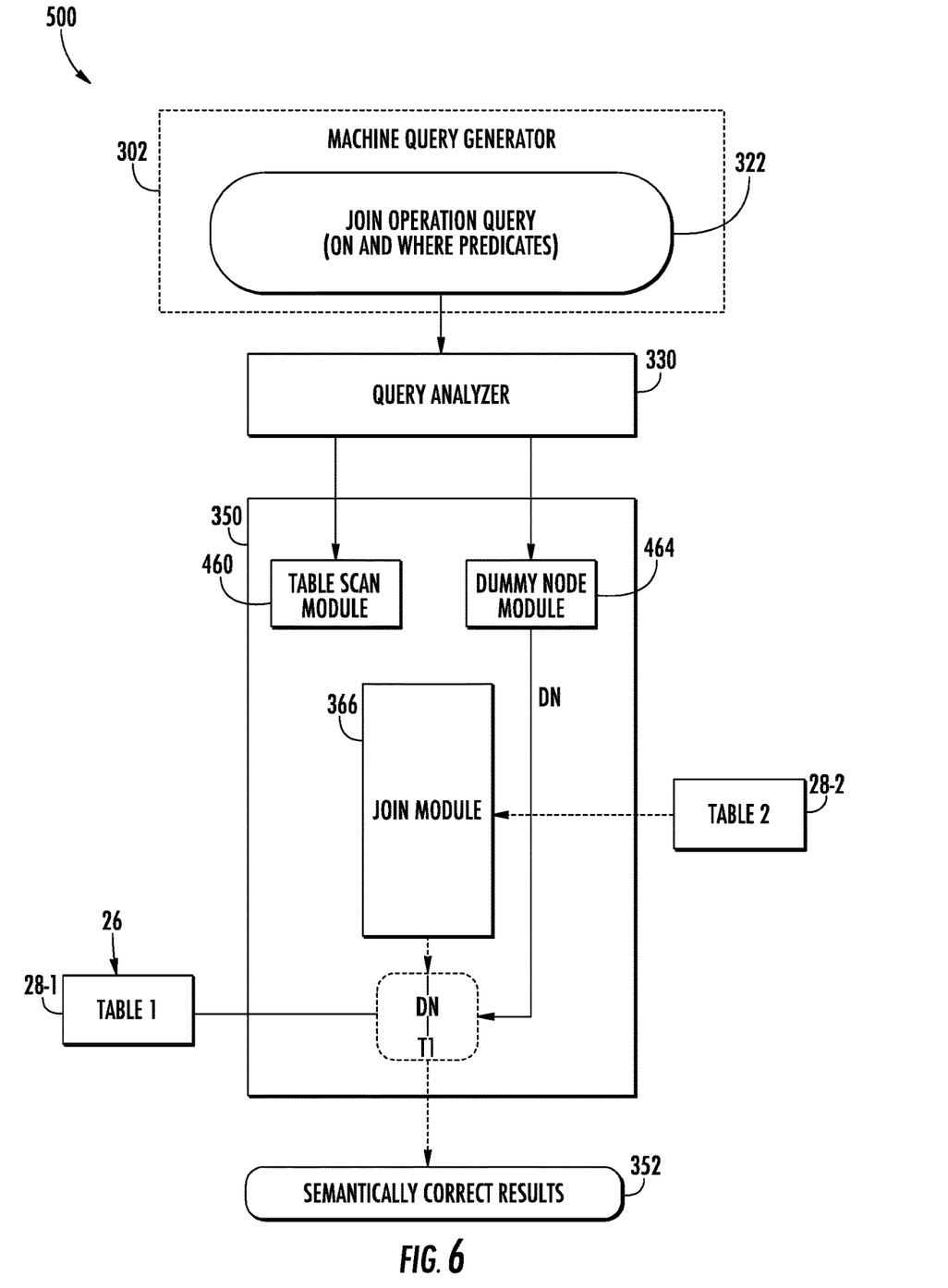

FIG. 6 is a block diagram schematically illustrating portions of an example relational database system 500. Database system 500 is similar to database systems 20 and 300 in that database system 300, in response to the predicates of the join operation query being always true or always false, bypasses the scan or read operation of at least one of the tables. By bypassing an otherwise unnecessary or redundant scan or read operation, system 300 may reduce CPU usage, may reduce memory usage, may reduce input/output operations, may reduce inter process communications and, may improve concurrency in response time while reducing the amount of data being routed. In contrast to relational database system 300, relational database system 500 skips or bypasses the join operation of the query altogether, wherein system 500 directly outputs a generated specific values such as null value or dummy node DN as part of the semantically correct results 352. In some circumstances, the dummy node may be the absence of any value or nothing. Database system 500 is similar to system 300 except that optimization engine 350 comprises table scan module 460 and dummy node module 464 in place of table scan module 360 and dummy node module 364, respectively. Those remaining components of system 500 which correspond to components of system 300 are numbered similarly.

Table scan module 460 is similar table scan model 360 except that table scan module 460 directly outputs the scan results for a table being scanned as part of the semantically correct results 352 in response to a scan of the other table being bypassed based upon the comparison of the predicates by the query analyzer 330. Dummy node module 464 is similar to dummy node module 364 except that dummy node module 464 directly outputs a dummy node DN as part of the semantically correct results 352 for a scan bypassed table instead of outputting a dummy node as an input for join module 366 for the scan bypassed table. In some circumstances, the dummy node may be the absence of any value or nothing.

In the example illustrated, the query 322 is illustrated as comprising a left join (LJ) join operation query, wherein the predicates have been determined to query analyzer 330 to be mutually exclusive, always false. As a result, table scan module 360 carries out a scan of table 28-1 (the left table) and directly outputs data T1 as part of the semantically correct results 352, but bypasses the scan of table 28-2 (the right table). Instead, dummy node module 364 outputs the specific values such as NULL or nothing for table 28-2 which is directly outputted as part of the semantically correct results 352. This way, even the Join operation is avoided as the specific NULL values or nothing are directly augmented to the output of T1 table 28-1. As should be appreciated, in circumstances where query analyzer 330 determines that the predicates of query 322 are not mutually exclusive (not always false), table scan module 460 may scan both tables 28 and provide the results of both scans to join module 366 for carrying out the join operation query and outputting the semantically correct results 352 based upon the scanned data from both tables 28.

Figure 7:
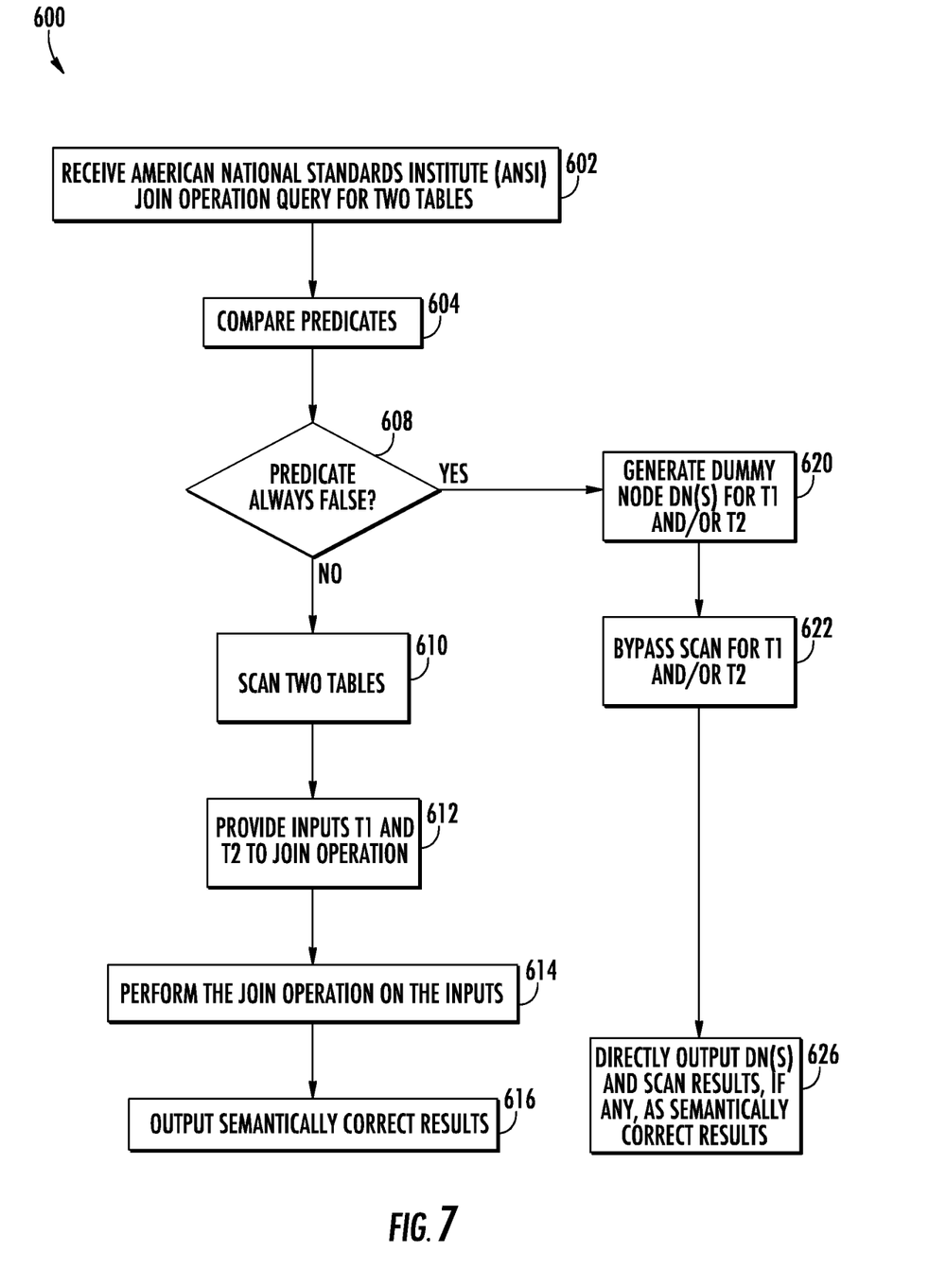

FIG. 7 is a flow diagram of an example ANSI join operation query response method 600 being carried out by system 500. As indicated by block 602, query analyzer 330 receives the ANSI join operation query for the two tables 28. As described above, the join operation query may be one that is automatically generated or output by machine query generator 302. This automated process for the generation of queries is largely without human intervention and is carried out at relatively high frequencies.

As indicated by block 604, query analyzer 330 evaluates the predicates of the query to determine whether the predicates are mutually exclusive (always false). As indicated by decision block 608 and block 610, if the predicates are not always false, are not mutually exclusive, table scan module 360 proceed with scanning of both tables 28-1 and 28-2. As indicated by block 612, the results of such table scans are provided inputs T1 and T2 to join module 366. Thereafter, as indicated by blocks 614 and 616, join module 366 performs a join operation on the inputs and outputs the semantically correct results for the join operation.

As indicated by decision block 608 and block 620, in response to the query analyzer determining that the predicates are mutually exclusive, are always false, query analyzer 330 outputs signals triggering the generation of a dummy node for at least one of tables 28. As indicated by block 622, those tables which have been bypassed and for which a dummy node has been generated, are not scanned by table scan module 360. As indicated by block 626, the dummy node or dummy nodes are directly output as part of the semantically correct results 626 which also include the scan results of any table which were scanned. The execution of the join operation itself by join module 366 is bypassed.

The particular table 28 for which a dummy node is generated is dependent upon the particular table for which a scan is being bypassed which is dependent upon the nature of the join operation query. The table below identifies those tables for which a scan is bypassed and for which a dummy node is alternatively generated and directly output as part of the semantically correct results for each of the various types of joint operations.

IJ—Inner Join, LJ—Left Outer Join, RJ—Right Outer Join, FJ—Full Outer Join, SJ—Semi Join, AJ—Anti Semi Join

| Join Type | Condition | Original Relational Expression | Direct Output of Results |
|---|---|---|---|
| Inner Join | ON Clause always evaluates to FALSE | IJ / \ T1  T2 | DN |
| Inner Join | WHERE Clause always evaluates to FALSE | IJ / \ T1  T2 | DN |
| Left Outer Join | ON Clause always evaluates to FALSE | LJ / \ T1  T2 | DN <br> T1 |
| Left Outer Join | WHERE Clause always evaluates to FALSE | LJ / \ T1  T2 | DN |
| Right Outer Join | ON Clause always evaluates to FALSE | RJ / \ T1  T2 | DN <br> T2 |

-continued

| Join Type | Condition | Original Relational Expression | Direct Output of Results |
|---|---|---|---|
| Right Outer Join | WHERE Clause always evaluates to FALSE | RJ / \ T1  T2 | DN |
| Full Outer Join | WHERE Clause always evaluates to FALSE | FJ / \ T1  T2 | DN |
| Semi Join | **WHERE Clause always evaluates to FALSE | SJ / \ T1  T2 | DN |
| Anti-Semi Join | **WHERE Clause always evaluates to FALSE | AJ / \ T1  T2 | DN T1 |

**WHERE clause of the subquery

As shown by the above table, the dummy module or dummy node module 364 directly outputs a dummy node/null result and a second dummy node/null result for the first table and second table, respectively, as part of the semantically correct results in response to the join operation query being one of a full outer join and a semi join and the join operation query being identified as having mutually exclusive "where" clause predicates.

The dummy module or the dummy module or dummy node module 364 directly outputs a dummy node/null result and a second dummy node/null result for the first table and second table, respectively, as part of the semantically correct results in response to the join operation query being an outer join and the join operation query being identified as having mutually exclusive "where" clause predicates.

The dummy module or dummy node module 364 directly outputs a dummy node/null result and a second dummy node/null result for the first table and second table, respectively, as part of the semantically correct results in response to the join operation query being an inner join and the join operation query being identified as having mutually exclusive "on" clause predicates.

The dummy module or dummy node module 364 directly outputs a dummy node/null result for the second table, respectively, as part of the semantically correct results in response to the join operation query being an anti-semi join and the join operation query being identified as having mutually exclusive "where" clause predicates.

Figure 8:
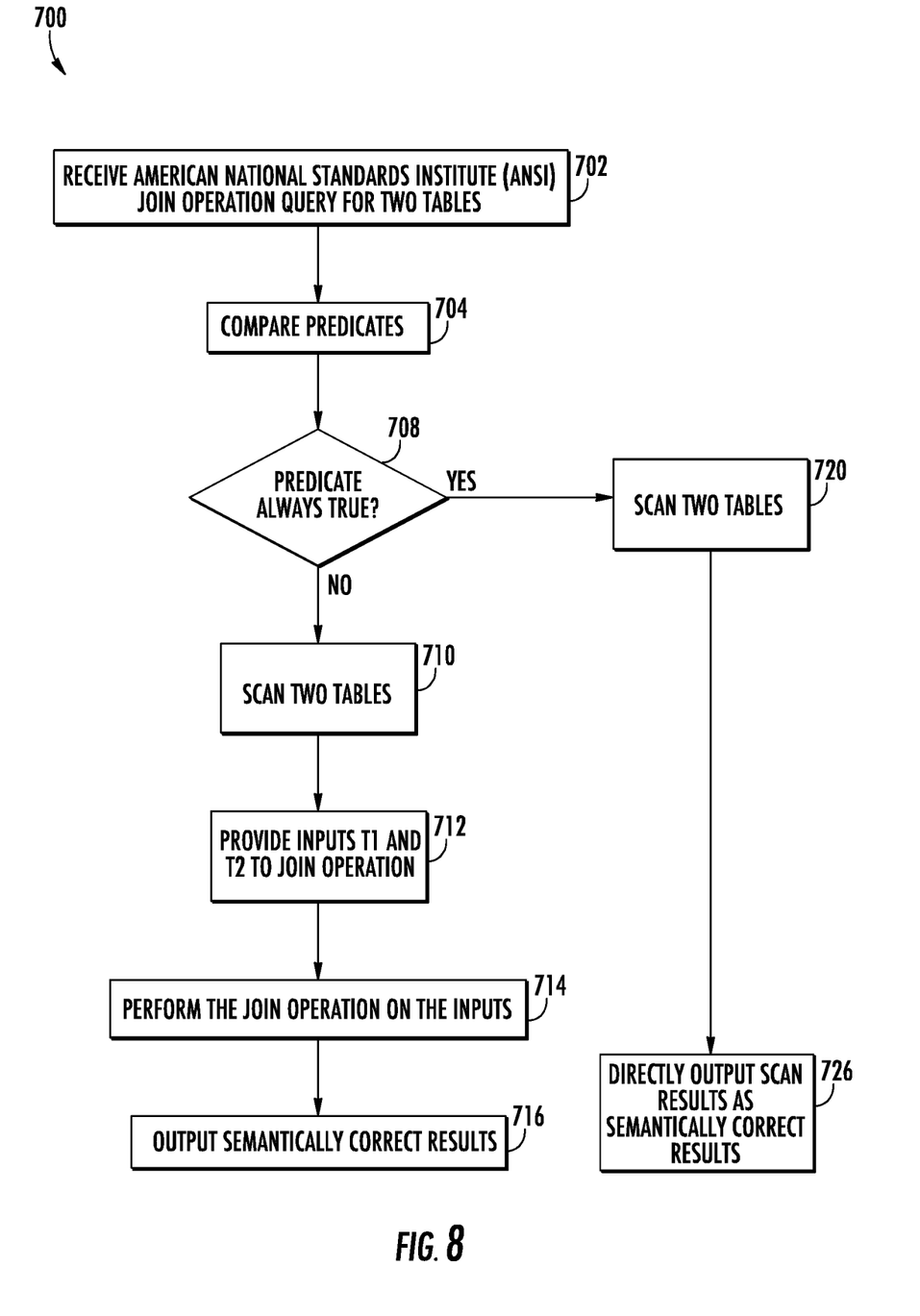

FIG. 8 is a flow diagram of an example ANSI join operation query response method 700 being carried out by system 500. Method 700 may be carried out by system 500 where the join operation query includes predicates that are determined to be always true. As indicated by block 702, query analyzer 330 receives the ANSI join operation query for the two tables 28. As described above, the join operation query may be one that is automatically generated or output by machine query generator 302. This automated process for the generation of queries is largely without human intervention and is carried out at relatively high frequencies.

As indicated by block 704, query analyzer 330 compares the predicates of the query to determine whether the predicates are always true. As indicated by decision block 708 and block 710, if the predicates are not always true, table scan module 360 proceed with scanning of both tables 28-1 and 28-2. As indicated by block 712, the results of such table scans are provided inputs T1 and T2 to join module 366.

Thereafter, as indicated by blocks 714 and 716, join module 366 performs a join operation on the inputs and outputs the semantically correct results for the join operation.

As indicated by decision block 708 and block 720, in response to the query analyzer determining that the predicates are always true, query analyzer 330 outputs signals causing scan table scan module 460 to carry out the scan of both tables, but to directly output the results of the two scans as part of the semantically correct results 726. The execution of the join operation itself by join module 366 is bypassed.

Although the present disclosure has been described with reference to example implementations, workers skilled in the art will recognize that changes may be made in form and detail without departing from the spirit and scope of the claimed subject matter. For example, although different example implementations may have been described as including features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A relational database system for performing a join operation between a first table and a second table, the system comprising:
a query analyzer to compare predicates of a join operation query for an American National Standards Institute (ANSI) compliant database to determine that the predicates are always true or always false;
an optimization engine, based upon comparison of the predicates, to bypass a scan of the second table as part of outputting semantically correct results for the join operation in response to the determination that the predicates are always true or always false.

2. The relational database system of claim 1, wherein the database optimization engine comprises a dummy node generator that, based upon the comparison of the predicates, outputs nulls or nothing as part of the semantically correct results for the join operation.

3. The relational database system of claim 1, wherein the database optimization engine comprises a join module to receive a first input from a scan of the first table and a second input from a scan of the second table, wherein the join module, based upon the comparison of the predicates, outputs nulls as part of the semantically correct results for the join operation.

4. The relational database system of claim 1, wherein the database optimization engine comprises:
a join module to receive a first input from a scan of the first table and a second input from a scan of the second table; and
a dummy module that outputs a dummy input based upon the comparison of the predicates, wherein the optimization engine is to perform the join operation with the dummy input in place of the second input.

5. The relational database system of claim 4, wherein the dummy module is to output the dummy input and a second dummy input in response to the join operation query being one of a full outer join and a semi join and the join operation query being identified as having mutually exclusive where clause predicates and wherein the join module is to output the semantically correct results for the join operation query using upon the dummy input and the second dummy node in place of the first input and the second input, respectively, to the join module.

6. The relational database system of claim 1, wherein the database optimization engine comprises a null output generator, wherein the null output generator is to output a first null result or a second null result for the first table or the second table, respectively, as part of the semantically correct results in response to the join operation query being a left/right outer join and the left/right outer query being identified as having mutually exclusive "ON" clause predicates.

7. The relational database system of claim 1, wherein the database optimization engine comprises:
- a join module to receive a first input from a scan of the first table and a second input from a scan of the second table; and
- a dummy module, wherein the dummy module is to output a first dummy input and a second dummy input in response to the join operation query being an outer join and the join operation query being identified as having mutually exclusive "WHERE" clause predicates and wherein the join module is to output the semantically correct results for the join operation query using the first dummy input and the second dummy input in place of the first input and the second input, respectively.

8. The relational database system of claim 1 further comprising a null output generator, wherein the null output generator is to output a first null result or a second null result for the first table and the second table, respectively, as part of the semantically correct results in response to the join operation query being an outer join and the join operation query being identified as having mutually exclusive where clause predicates.

9. The relational database system of claim 1, wherein the database optimization engine comprises:
- a join module to receive a first input from a scan of the first table and a second input from a scan of the second table; and
- a dummy module, wherein the dummy module is to output a first dummy input and a second dummy input in response to the join operation query being an inner join and the join operation query being identified as having mutually exclusive on clause predicates and wherein the join module is to output the semantically correct results for the join operation query using the first dummy input and the second dummy input in place of the first input and the second input, respectively, to the join operation.

10. The relational database system of claim 1, wherein the database optimization engine comprises a null output generator, wherein the null output generator is to output a first null result or a second null result for the first table and the second table, respectively, as part of the semantically correct results in response to the join operation query being an inner join and the join operation query being identified as having mutually exclusive on clause predicates.

11. The relational database system of claim 1, wherein the database optimization engine comprises:
- a join module to receive a first input from a scan of the first table and a second input from a scan of the second table; and
- a dummy module, wherein the dummy module is to output a first dummy input in response to the join operation query being an anti-semi join and the join operation query being identified as having mutually exclusive where clause predicates and wherein the join module is to output the results for the join operation query using the first dummy input in place of the first input, to the join operation.

12. The relational database system of claim 1 further comprising a null output generator, wherein the null output generator is to output a null result for the second table as part of the semantically correct results in response to the join operation query being an left outer join and the join operation query being identified as having always true "where" clause predicates.

13. The relational database system of claim 1 further comprising:
- a processor; and
- a non-transitory computer-readable medium containing instructions to direct the processor to function as the query analyzer and the database optimization engine.

14. A method comprising:
- analyzing an American National Standards Institute (ANSI) join operation query for two tables to compare predicates of the join operation query to determine whether the predicates are always true or always false; and
- bypassing a scan of at least one of the two tables in response to the comparison yielding a result that the predicates are always true or always false as part of outputting semantically correct ANSI compliant results for the join operation query.

15. The method of claim 14 comprising bypassing a join operation and directly outputting null results or nothing for the semantically correct ANSI compliant results for the join operation query based upon the comparison of the predicates.

16. The method of claim 15 further comprising performing a join operation with dummy inputs generated based upon the comparison of the predicates.

17. A scan redundancy eliminator for use with an American National Standards Institute (ANSI) relational database system, the scan redundancy eliminator comprising a non-transitory computer-readable medium containing instructions to direct a processor to:
- analyze a join operation query for two tables to compare predicates of the join operation query to determine whether the predicates are always true or always false; and
- output a scan bypass command to bypass a scan of at least one of the two tables in response to the comparison of the predicates of the join operation query yielding a result of the predicates are always true or the predicates are always false when preparing semantically correct results for the join operation query.

18. The scan redundancy eliminator of claim 17, where the instructions are to direct the processor to output a dummy input in response to the join operation query being identified as having a predetermined relationship between the predicates, the dummy input being usable by a join module to output the semantically correct results.

19. The scan redundancy eliminator of claim 17, wherein the instructions are to direct the processor to output a null result or nothing for at least one of the two tables as part of the semantically correct results in response to the join operation query being identified as having a predetermined relationship between the predicates.

20. The scan redundancy eliminator of claim 17, wherein the instructions are to direct the processor to output the scan bypass command in response to the join operation query being identified as having mutually exclusive predicates.

* * * * *